US007030581B1

(12) United States Patent
Ikeda

(10) Patent No.: US 7,030,581 B1
(45) Date of Patent: Apr. 18, 2006

(54) MOTOR CONTROLLER

(75) Inventor: Hidetoshi Ikeda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/196,461

(22) Filed: Aug. 4, 2005

(30) Foreign Application Priority Data

Dec. 3, 2004 (JP) ............................ 2004-350935

(51) Int. Cl.
*H02P 7/00* (2006.01)

(52) U.S. Cl. ...................... 318/432; 318/434; 318/609; 318/610; 318/619; 318/652

(58) Field of Classification Search ................ 318/432, 318/434, 609, 619, 652, 610
See application file for complete search history.

(56) References Cited

U.S. PATENT DOCUMENTS 5,274,314 A * 12/1993 Maqueira .................... 318/632
5,475,291 A 12/1995 Yoshida et al. ........ 318/568.22
5,541,486 A * 7/1996 Zoller et al. ................ 318/619
5,886,491 A * 3/1999 Yoshida et al. ............. 318/592
5,942,868 A * 8/1999 Mok .......................... 318/561
5,973,467 A * 10/1999 Eguchi ....................... 318/609
6,127,793 A * 10/2000 Kerner ....................... 318/561
6,152,254 A * 11/2000 Phillips ...................... 180/422
6,274,995 B1 * 8/2001 Kerner ....................... 318/611
6,844,693 B1 * 1/2005 Tazawa et al. .............. 318/561
6,879,053 B1 * 4/2005 Welches et al. ................ 290/6
6,903,806 B1 * 6/2005 Morisada ..................... 355/72

FOREIGN PATENT DOCUMENTS

JP 10-56790 2/1998
JP 2002-27784 1/2002
WO WO 02/5414 A1 1/2002

* cited by examiner

*Primary Examiner*—Rita Leykin
(74) *Attorney, Agent, or Firm*—Oblon, Spivak, McClelland, Maier & Neustadt, P.C.

(57) ABSTRACT

This invention relates to a motor controller for driving an object to be controlled by torque from a motor responding to a computed torque command, the object being provided with the motor and a mechanical load. The motor controller includes: a feedback computation unit into which is inputted a positional command signal or a speed command signal, and a motor rotational signal which is a detected value of the motor's rotational angle or speed, the feedback computation unit being for computing the torque command by a computation in which the transfer function for a feedback loop from the motor rotational signal to the torque command includes a pole or a zero point; a response parameter input unit for inputting a response parameter; and a ratio parameter input unit for inputting a ratio parameter. A loop gain which is the gain of the feedback loop is determined based on the response parameter. The pole or the zero point of the feedback loop is determined based on the response parameter and the ratio parameter in such a way that the ratio of a response frequency which is quotient of the loop gain divided by an inertia value of the controlled object to a frequency corresponding to the pole or the zero point of the feedback loop is the value determined by the ratio parameter.

6 Claims, 4 Drawing Sheets

MOTOR CONTROLLER

BACKGROUND OF THE INVENTION

1. Field of the Invention

The present invention relates to a motor controller for a driving unit used in processing machines, semiconductor manufacturing equipment, various conveyance equipment, or the like.

2. Description of the Related Art

A motor controller needs to generate torque commands through a computation by a feedback loop based on a motor speed or a motor angle, and to properly set out a zero-point frequency, a filter frequency, and a pole and a zero point of a transfer function of the feedback loop and the like related to the loop gain and a speed PI control. It takes a time to individually adjust those; in addition, it is difficult for beginners to adjust those because they need knowledge to properly make the adjustment.

Prior art that improves these adjustment described above, for example, is to configure the controller in such a way that one input parameter is inputted from outside and then the loop gain, pole and zero point of the transfer function of the feedback loop are set out using a specific relational equation derived from the input parameter, enabling the adjustment by one parameter to be easily made (Refer to Patent Document 1; Japanese Patent Laid-Open No. 27784/2002).

There have been problems in that not only it needs manpower and takes a time to make good adjustments in setting out individually a loop gain of a feedback loop, a pole frequency, a zero-point frequency, and the like, but also it is difficult without specialized knowledge.

In a system in which adjustment are made by one input parameter as described in the above Patent Document 1, in general, such a simple model of a controlled object as approximates a most common inertia body (rigid body) is considered, and then a relational equation based on the one parameter described above is determined, so that the system suits to general-use application and controlling specifications.

However, an actual controlled object has characteristics such as mechanical resonances at different frequencies, resulting in its various characteristics. In addition, controlling specifications are not standardized in such a point as to which is more prioritized, converging speed or response smoothness, depending on the applications in which the motor controlled is employed.

As a result, there have been problems in that conventional motor controller can not reach a properly adjust state by only adjustment by means of one input parameter, causing, in some cases, adjustment each being greatly deviated from the proper adjustments.

SUMMARY OF THE INVENTION

In a first aspect of the present invention, a motor controller for driving, by torque from a motor responding to a computed torque command, an object to be controlled, the object being provided with the motor and a mechanical load, the motor controller includes: a feedback computation unit into which is inputted a positional command signal or a speed command signal, and a motor rotational signal which is a detected value of the motor's rotational angle or speed, the feedback computation unit being for computing said torque command by a computation in which the transfer function for a feedback loop from said motor rotational signal to said torque command includes a pole or a zero point; a response parameter input unit for inputting a response parameter; and a ratio parameter input unit for inputting a ratio parameter; wherein a loop gain which is the gain of said feedback loop is determined based on said response parameter, and based on said response parameter and said ratio parameter, the pole or the zero point of said feedback loop is determined in such a way that the ratio of a response frequency which is quotient of said loop gain divided by an inertia value of the controlled object, to a frequency corresponding to the pole or the zero point of said feedback loop, is the value determined by said ratio parameter.

The first aspect of the present invention causes the easy adjustment according to controlling specifications and the appropriate adjustment in a short time corresponding to applications.

In a second aspect of the present invention, a motor controller for driving, by torque from a motor responding to a computed torque command, an object to be controlled, the object being provided with the motor and a mechanical load, the motor controller includes: a feedback computation unit into which is inputted a command signal, and a motor rotational signal which is a detected value of the motor's rotational angle or speed, the feedback computation unit being for computing said torque command by a computation in which the transfer function for a feedback loop from said motor rotational signal to said torque command includes a pole or a zero point; a response parameter input unit for inputting a response parameter; and an absolute value parameter input unit for inputting an absolute value parameter; a ratio parameter input unit for inputting a ratio parameter; and a switching signal input unit for inputting a switching signal for selecting either the setting of an absolute value or the setting of a ratio; wherein a loop gain which is the gain of said feedback loop is determined based on said response parameter; when said switching signal selects the setting of an absolute value, the zero point or the pole of said feedback loop is determined based on said absolute value parameter, independently from said response parameter; and when said switching signal selects the setting of a ratio, based on said response parameter and said ratio parameter, the pole or the zero point of said feedback loop is determined in such a way that the ratio of a response frequency which is quotient of said loop gain divided by an inertia value of the controlled object, to a frequency corresponding to the pole or the zero point of said feedback loop, is the value determined by said ratio parameter.

The second aspect of the present invention causes the easy adjustment according to controlling specifications and characteristics of controlled objects and the appropriate adjustment in a short time corresponding to applications and characteristics of machines.

In a third aspect of the present invention, a motor controller for driving, by torque from a motor responding to a computed torque command, an object to be controlled, the object being provided with said motor and a mechanical load, the motor controller includes: a feedback computation unit into which is input a speed command signal and a motor speed which is a detected value of said motor's speed, the feedback computation unit being for computing said torque command by a computation in which the transfer function for a feedback loop from said motor speed to said torque command is obtained by a proportional integral computation and a low-pass filter computation; a response parameter input unit for inputting a response parameter; a first absolute-value parameter input unit for inputting a first absolute-parameter; a first ratio parameter input unit for inputting a first ratio parameter; and a first switching signal input unit for inputting a first switching signal for selecting either the setting of an absolute value or the setting of a ratio; a second absolute-value parameter input unit for inputting a second absolute-value parameter; a second ratio parameter input unit for inputting a second ratio parameter; and a second switching signal input unit for inputting a second switching signal for selecting either the setting of an absolute value or the setting of a ratio; wherein: a loop gain which is the gain of said feedback loop is determined based on said response parameter; when said first switch signal selects the setting of an absolute value, a PI zero-point frequency which is the frequency of a zero point of proportional integral computation is determined based on the first absolute value parameter, independently from said response parameter; when said first switching signal selects the setting of a ratio, said PI zero-point frequency is determined, based on said response parameter and said first ratio parameter, in such a way that the ratio of said response frequency to said PI zero-point frequency is the value determined by said first ratio parameter; when said second switching signal selects the setting of an absolute value, a low-pass filter frequency which is a pole frequency of said low-pass filter computation is determined based on said second absolute value parameter, independently from said response parameter; and when said second switching signal selects the setting of a ratio, said low-pass filter frequency is determined in such a way that the ratio of said response frequency to said low-pass filter frequency, is the value determined by said second ratio parameter.

The third aspect of the present invention causes the easy adjustment according to controlling specifications and characteristics of controlled objects and the appropriate adjustment in a short time corresponding to applications and characteristics of machines.

DETAILED DESCRIPTION OF THE PREFERRED EMBODIMENT

The invention will now be explained in detail with reference to the drawings showing the embodiment thereof.

Embodiment 1

Figure 1:
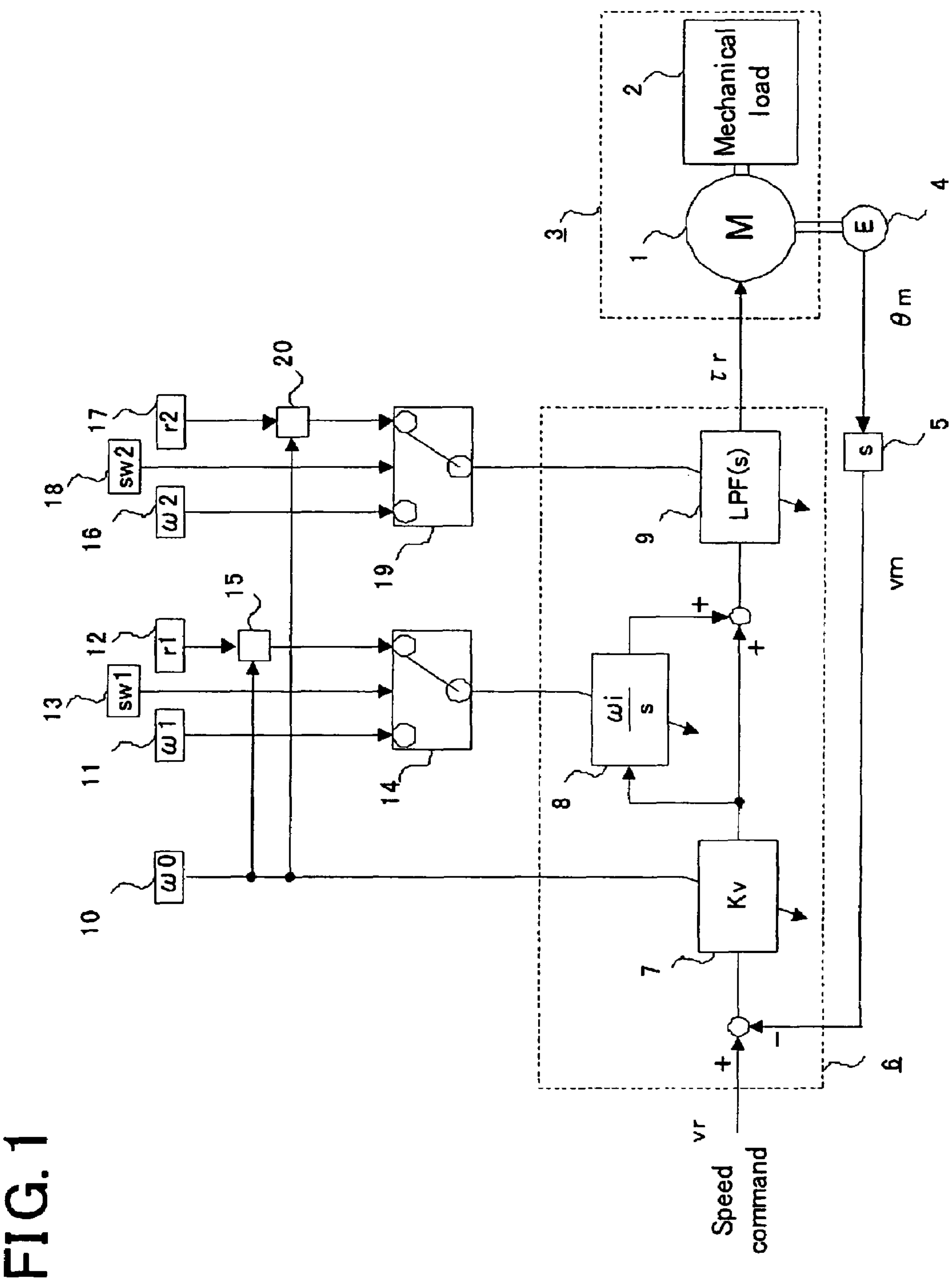
FIG. 1 is a block diagram illustrating a motor controller for Embodiment 1 of the present invention.

FIG. 1 is a block diagram illustrating a motor controller for Embodiment 1 of the present invention. A motor 1 generates a torque responding to torque commands τr, to drive a controlled object 3 composed of the motor 1 and a mechanical load 2 coupled with the motor 1. Moreover, a motor speed vm that is the rotational speed of the motor 1 is detected by detecting a motor angle θm that is the rotational angle of the motor 1 by an encoder 4, and then differentiating, by a speed computation unit 5, the motor angle θm.

Next, a speed command vr and the motor speed vm are inputted to a feedback computation unit 6, and the feedback computation unit 6 computes torque commands τr by the computation described below.

In the feedback computation unit 6, the difference signal between the speed command vr and the motor speed vm is inputted to a speed proportional amplifier 7, and the speed proportional amplifier 7 outputs the signal to multiply the input by a speed gain Kv. Next, the output of the speed proportional amplifier 7 is inputted to an integral amplifier 8 and the integral amplifier 8 outputs the signal in which the input is integrated after multiplied by an integral gain ωi. Next, the signal in which the output from the speed proportional amplifier 7 and the output from the integral amplifier 8 are summed up is inputted to a low-pass filter 9, so that the low-pass filter 9 applies to the inputted signal, for example, a low-pass filter computation LPF(s) with the pole frequency ωf given in the following equation 1, and then outputs the resultant signal; the feedback computation unit 6 outputs, as the torque commands τr, the output from the low-pass filter 9. Here, s shows the Laplace operator.

$$LPF(s)=\omega f/(s+\omega f) \qquad \text{(equation 1)}$$

The feedback computation unit 6, by operating as described above, performs the computation in which the transfer function FB(s) of the feedback loop from the motor speed vm to the torque commands τr is shown by the following equation 2.

$$FB(s)=PI(s)\cdot LPF(s) \qquad \text{(equation 2)}$$

Here, PI(s) of above-mentioned equation 2 is a computation, called a proportion integral computation (PI computation), shown by the following equation 3.

$$PI(s)=Kv(s+\omega i)/s \qquad \text{(equation 3)}$$

Here, in the above-mentioned feedback computation unit 6, parameters used in the computation of the feedback loop are; a gain, related to the entire transfer function FB(s) of the feedback loop, that is, a loop gain Kv, a zero-point frequency ωi in the ratio integral computation (hereinafter referred to as a PI zero-point frequency ωi), and a pole frequency ωf of the low-pass filter LPF(s) (hereinafter referred to as a filter frequency ωf).

Next, the setting method for the above-mentioned computing parameters is explained referring to FIG. 1. Firstly, a response parameter ω0 is inputted by a response parameter input unit 10 into the speed proportional amplifier 7, based on which, the speed gain Kv of the speed proportional amplifier 7, that is, the loop gain Kv is set out. The setting method includes, for example, a method in which the loop gain Kv is set so that it is made equal to the response parameter ω0, a method in which an inertial moment value J of a controlled object is measured or set out and then the product of the response parameter ω0 and the inertia moment value J is set to be the loop gain Kv, and the like.

Next, a first switching signal sw1 is inputted, to a first switch 14, by a first switching signal input unit 13. Here the first switching signal sw1 is the parameter for selecting either the setting of an absolute value or the setting of a ratio. According to the setting, the setting of an absolute value or the setting of a ratio, the first switching signal sw1 switches the input of the first switch 14 to the left or right.

Next, when the first switching signal sw1 selects the setting of an absolute value, a first absolute value parameter ω1 is inputted to the integral amplifier 8 from a first absolute value parameter input unit 11, and then, responding to the value, the integral gain ωi of the integral amplifier 8, that is, the PI zero-point frequency ωi is set out.

Next, when the first switching signal sw1 selects the setting of a ratio, a first ratio parameter r1 is inputted to an integral gain ratio setting unit 15, from a first ratio parameter input unit 12. Moreover, given that a response frequency ωc is the value in which the loop gain Kv corresponding to the response parameter ω0 is divided by the inertial moment value J, an integral gain ratio setting unit 15, based on the response parameter ω0 and the first ratio parameter r1, sets out the PI zero-point frequency ωi, so that the ratio of the PI zero-point frequency ωi to the response frequency ωc becomes the value set out by the first ratio parameter r1.

Next, a second switching signal sw2 is inputted to a second switch 19 from a second switching signal input unit 18. Here the second switching signal sw2 is the parameter that selects either the setting of an absolute value or the setting of a ratio. According to the setting, the setting of an absolute value or the setting of a ratio, the second switching signal sw2 switches the input of the second switch 19 to the left or right.

Next, when the second switching signal sw2 selects the setting of an absolute value, a second absolute value parameter ω2 is inputted to the low-pass filter 9 from a second absolute value parameter input unit 16, depending on which, a filter frequency ωf of the low-pass filter 9 is set out.

Next, when the second switching signal sw2 selects the setting of ratio, a second ratio parameter r2 is inputted to a filter frequency ratio setting unit 20 from a second ratio parameter input unit 17. Moreover, the filter frequency ratio setting unit 20, based on the response parameter ω0 and a second ratio parameter r2, sets the filter frequency ωf so that the ratio of the filter frequency ωf to the response frequency ωc set by the response parameter ω0 becomes the value set by the second ratio parameter r2.

Here, the characters of the first ratio parameter r1 and the second ratio parameter r2 are explained. As described above, the first ratio parameter r1 sets out the first ratio ωi/ωc that is the ratio of the PI zero-point frequency ωi to the response frequency ωc. Moreover, the second ratio parameter r2 sets out the second ratio ωf/ωc that is the ratio of the filter frequency ωf to the response frequency ωc. Assuming that the loop gain Kv is fixed, that is, the response frequency ωc is fixed, the larger the first ratio is, the faster the motor speed vm converges to the same value as the speed command vr over a disturbance, enabling more accurate control. However, when the first ratio is increased too much, the control system becomes oscillatory at the frequency in the vicinity of the response frequency ωc. Therefore, the first ratio has indicative value in which it becomes constant regardless of the response frequency ωc, and is usually set to be about 0.2–0.4 accordingly. Moreover, when the second ratio is reduced, influence from noise of high frequencies such as influence from the quantization in an encoder 4 and the like can be reduced. However, when the second ratio is reduced too much, the control system becomes oscillatory at frequencies in the vicinity of the response frequency ωc. Therefore, the second ratio also has an indicative value that it becomes constant regardless of the response frequency ωc, and therefore, it is usually chosen to be about from few times to ten times.

Next, the adjusting operation of the motor controller of the present invention is explained. Firstly, the most standard case is explained. As the initial setting in starting the adjustment of the motor controller of the present invention, the first switching signal sw1 and the second switching signal sw2 are selected at the setting of ratio. Moreover, as described above, the appropriate values for the first ratio parameter r1 and the second ratio parameter r2 have been set out in advance to suit to as many applications as possible. Moreover, the response parameter ω0 is set out to a small value, so that it becomes as stable as possible in various applications. By setting an initial value such as this, in many cases, highly accurate response can be achieved only by adjusting the response parameter ω0 so as to gradually increase after its start. That is, the adjustment by one parameter as with the prior art shown in the patent document 1 can be achieved.

Figure 2:
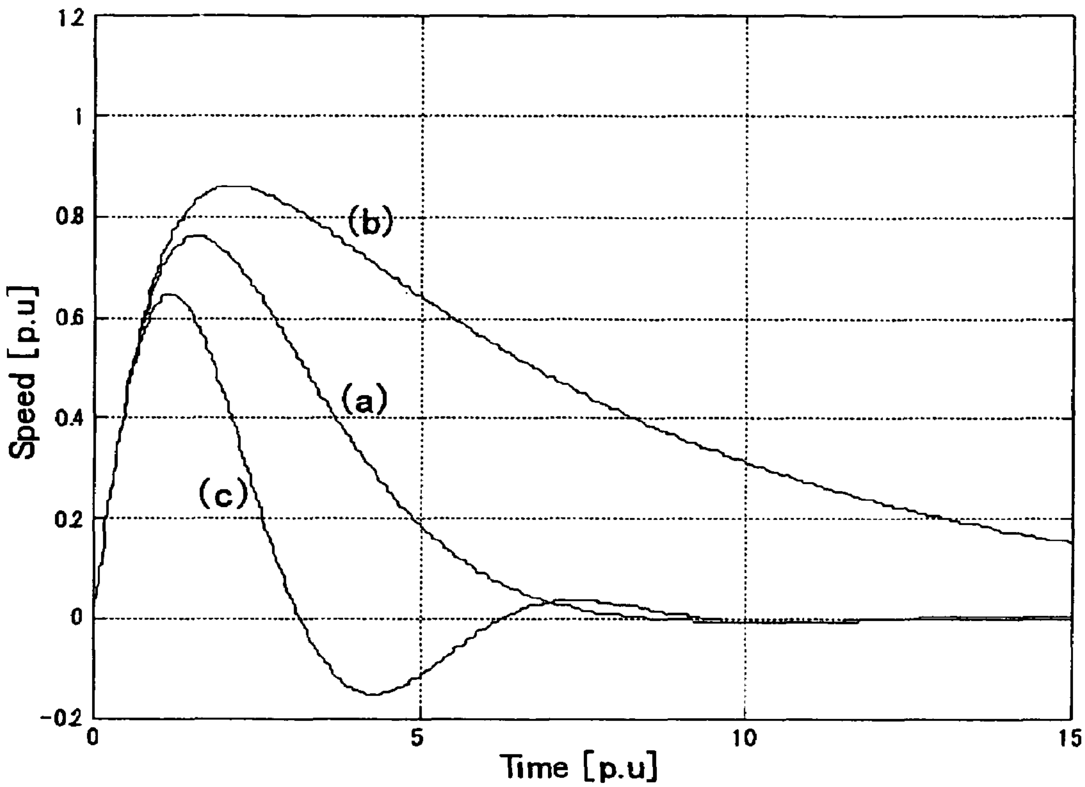
FIG. 2 is a graph illustrating time response with respect to a step disturbance using the motor controller for Embodiment 1 of the present invention.

On the other hand, though the first ratio and the second ratio mentioned above are determined, as the initial value, to be appropriate to as many cases as possible, there may be a case in which the appropriate value is not always suited depending on the applications to which the motor controller is applied. FIG. 2 shows the responses of the motor speed with respect to a stepped disturbance applied to the motor, when the first ratio is changed. FIG. 2 shows responses in the following cases, (a) the first ratio remains at initial value, (b) the first ratio is increased from the initial value, (c) the first ratio is reduced from the initial value.

Here, as a control specification associated with application, there may be a case in which the narrower margin of the motor speed fluctuation over the distance is required even if the system becomes oscillatory; in this case, it is understood that the first ratio had better be made greater than the initial value, as seen from FIG. 2.

On the other hand, as a control specification associated with application, there may be the case in which the motor speed vm is required to be controlled in as smooth acceleration as possible rather than be controlled so as to converge abruptly; in this case, it is understand that the first ratio had better be made smaller than the initial value, as seen from FIG. 2. Moreover, as a control specification associated with application, when it is required to decrease influence due to disturbance as much as possible while maintaining vibration at high frequencies by the influence due to the above-described noise to be as small as possible, even if there is a possibility that the system becomes oscillatory in the vicinity of the response frequency, it may easily bring a preferable result to reduce the second ratio to one to two times.

In coping with variations of the control specification associated with application of the motor controller, the absolute value of the PI zero-point frequency and the filter frequency are not set out by the first absolute value input and the second absolute value input, but by the setting of the PI zero-point frequency and the filter frequency using the first ratio input and the second ratio input; therefore there is an advantage in that the adjustment is intuitive and easy, because the adjustment can be made, regardless of high/low of the response frequency ωc, within a predetermined range based on the predetermined value set out as the initial value.

Furthermore, the response frequency ωc is generally adjusted so as to obtain as fast as response as possible, that is, the loop gain Kv is adjusted to be as great as possible, so as to near stability limit. However, in the state in which the loop gain Kv has been raised to the vicinity of the stability limit, because the stability changes sensitively responding to the change in the PI zero-point frequency ωi and the filter frequency ωf, the setting of the first ratio and the second ratio according to the above-described control specification becomes difficult. Therefore, when the control specification is deviated from a standard one, in an early stage of the adjustment in which the response frequency ωc is still small, the first ratio and the second ratio are changed from the initial value according to the control specification and then, the response frequency ωc gradually increases to the vicinity of the stability limit, thereby attaining optimum adjustment according to the control specification, in a short adjustment time.

Moreover, on the other hand, when the controlled object 3 has a mechanical resonance, attenuation of which is small at a frequency a little higher than a preferable response frequency, increasing the response frequency ωc, while maintaining fixed the first ratio and the second ratio that have been determined as a general initial value described above, makes the filter frequency ωf gradually increase from a small value, in addition, phase delay by the low-pass filter 9 takes place at the frequency higher than the vicinity of the filter frequency ωf. As a result, the motor speed vm significantly amplified by the mechanical resonance, with respect to the torque commands τr, at the resonance frequency, is fed back to the torque commands τr with the phase having been delayed in the feedback loop; consequently the oscillation occurs at the mechanical resonance frequency even if the response frequency ωc is considerably low. Therefore, when the mechanical resonance of controlled object 3 is known to be at the frequency in which the above-mentioned problem occurs, or when oscillation has occurred due to the mechanical resonance in a state in which the response frequency ωc is considerably low as mentioned above, the response frequency ωc can be increased, by increasing the filter frequency ωf that is higher than the mechanical resonance frequency, without causing the oscillation phenomenon mentioned above. Therefore, in the case mentioned above, if the second switching signal is, in an early stage of the adjustment, set out to the absolute value setting, the second absolute signal is set out so that the filter frequency ωf becomes higher than the mechanical resonance frequency, and also the first switching signal remains at the setting of a ratio, the adjustment that enables a high-speed, and highly accurate control can be easily achieved, only by gradually increasing the response frequency ωc, even if mechanical resonances occurs.

The embodiment of the present invention is configured as described above, and by employing the first ratio parameter input unit and the second ratio parameter input unit, an intuitive and easy adjustment on a constant value basis becomes possible independent of setting the response frequency. Moreover, because the adjustment can be achieved to increase the response frequency, after the first ratio and the second ratio have been set according to the control specification at early stage of the adjustment, an appropriate adjustment responding to the control specification associated with application can be achieved in a short time.

Moreover, by employing the first switching signal input unit and the second switching signal input unit that select either the setting of a ratio or the setting of an absolute value, the setting of a ratio or the setting of an absolute value can be selected according to the control specification and the characteristics of the controlled object at an early stage of the adjustment, thereby achieving an appropriate adjustment in a short time. In particular, by employing individually the first switching signal input unit and the second switching signal input unit, an adjustment can be achieved in a short time, in which fast response is obtained without causing the oscillation, even if mechanical resonance occurs in the controlled object.

Embodiment 2

Figure 3:
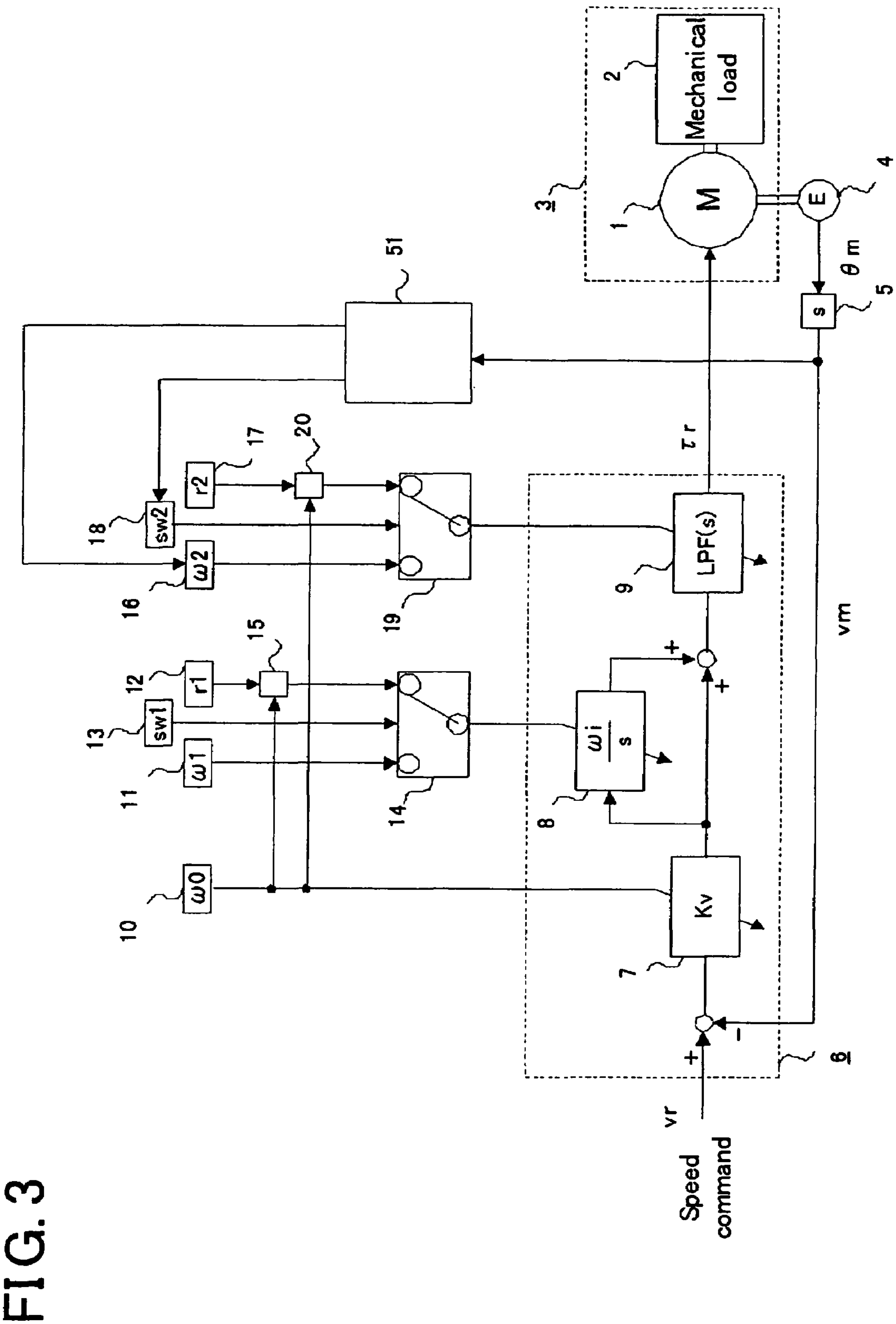
FIG. 3 is a block diagram illustrating a motor controller for Embodiment 2 of the present invention.

FIG. 3 is a block diagram illustrating a motor controller relevant to Embodiment 2 of the present invention. The same numerals as those of FIG. 1 show the same units and their explanations are therefore omitted. This Embodiment is configured by adding to Embodiment 1 a mechanical characteristic estimation unit 51 and an input and an output thereof, and explanations will be made for these units.

The mechanical characteristic estimation unit 51 estimates a mechanical resonance frequency of the controlled object 3 based on the detected motor speed vm, for example, by such a method as measuring vibration frequency when motor speed vm oscillates. Moreover, it is judged which is better for the second switching signal sw2 to select the setting of an absolute value or the setting of a ratio, based on the estimated mechanical resonance frequency, and the estimation unit 51 sets out the result to the second switching signal input unit 18. As a judgment method, as explained in Embodiment 1, when the mechanical resonance frequency is in the area where oscillation easily occurs when the frequency ωf of the low-pass filter is small, the setting of an absolute value is selected and set out as the second switching signal sw2.

Moreover, at the same time, the second absolute value parameter ω2 is set out to the second absolute value parameter input unit 16 so that the frequency ωf of the low-pass filter is larger than the mechanical resonance frequency. As a result, even if there is the mechanical resonance as mentioned above in the controlled object 3, an adjuster can realize a control system with fast response by increasing response frequency ωc to the vicinity of the limit only by changing a response parameter ω0.

In the method of setting the second absolute value parameter ω2, the parameter may be set out in such a way that the frequency ωf of the low-pass filter becomes sufficiently large value without based on the mechanical resonance frequency.

Because the present embodiment operates as mentioned above, by automatically setting the switching signal responding to the characteristics of the controlled object 3, the control system can be appropriately adjusted, responding to the characteristic of controlled object 3 in a short time, only by changing the response parameter.

Embodiment 3

Figure 4:
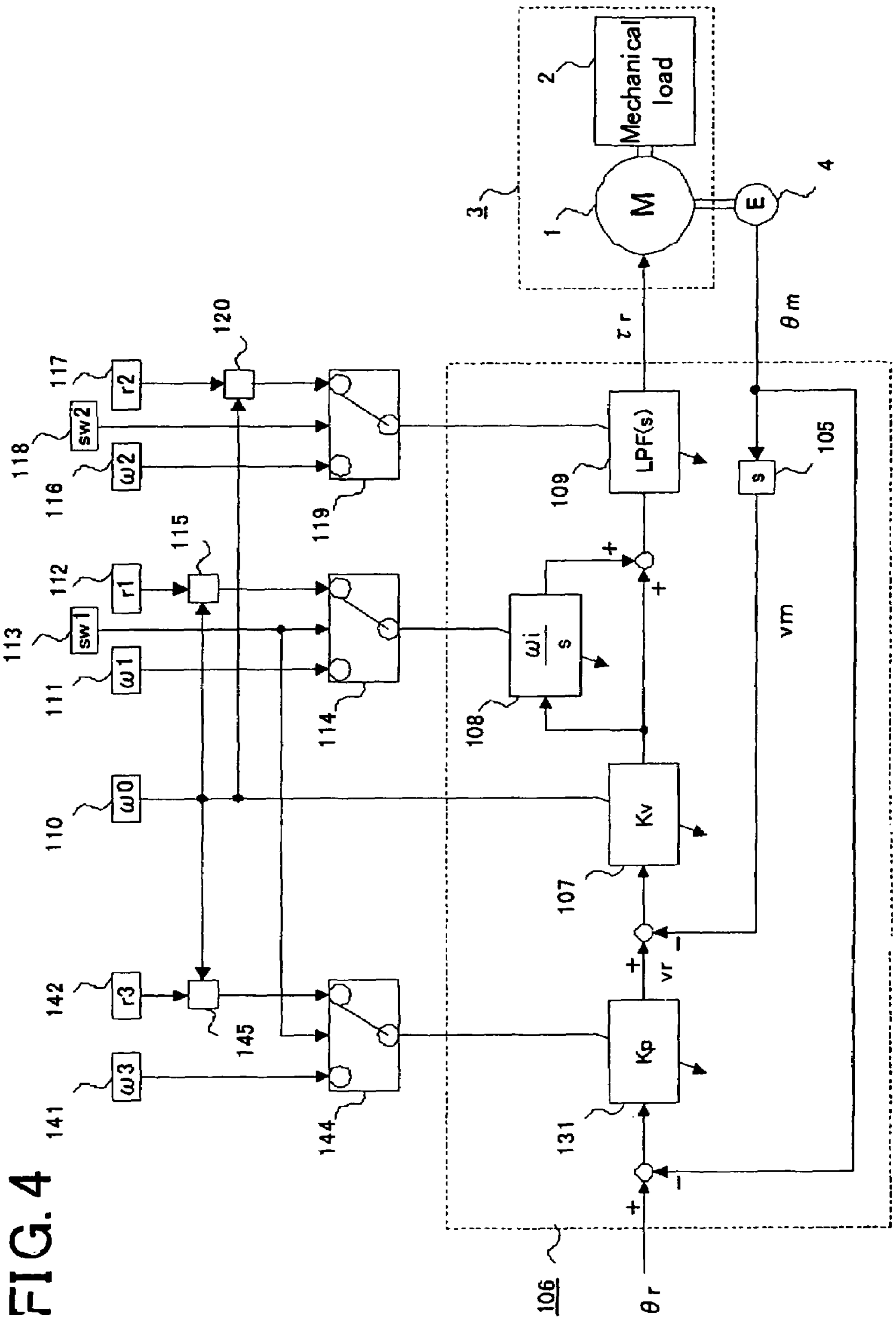
FIG. 4 is a block diagram illustrating a motor controller for Embodiment 3 of the present invention.

FIG. 4 is a block diagram illustrating a motor controller relevant to Embodiment 3 of the present invention. The present Embodiment relates to a motor controller that performs positional control, although Embodiment 1 and 2 relate to speed control. The same numerals as those of FIG. 1 show the same units and their explanations are therefore omitted.

A positional command θr and the motor angle θm are inputted into a feedback computation unit 106, and it computes the torque commands τr by the operation described next.

In the feedback computation unit 106, the difference signal between the positional command θr and the motor angle θm is inputted to a positional proportional amplifier 131, and then the positional proportional amplifier 131 outputs the signal, as the speed command vr, in which the input has been multiplied by positional gain Kp. Next, the difference signal between the speed command vr and the motor speed vm which the motor angle θm has been differentiated by a speed computation unit 105, is inputted to a speed proportional amplifier 107, and the speed proportional amplifier 107 outputs the signal in which the input has been multiplied by a speed gain Kv. Then, the output of the speed proportional amplifier 107 is inputted into the integral amplifier 108, and the integral amplifier 108 outputs the signal in which the input has been multiplied by an integral gain ωi and integrated. Next, the sum signal of the output from the speed proportional amplifier 107 and the output from the integral amplifier 108 is inputted to a low-pass filter 109, so that the low-pass filter 109 outputs the signal in which low-pass filter computation LPF(s) with a pole frequency ωf has been applied to it, which is given by the equation 1 explained in the Embodiment 1, and then the feedback computation unit 106 outputs the output from the low-pass filter 109 as torque commands τr.

The feedback computation unit 106 operates as described above, so as to compute the transfer function FB(s) of the feedback loop from the motor angle θm to the torque commands τr shown by the following equation 4.

$$FB(s)=(s+Kp)\cdot PI(s)\cdot LPF(s) \quad \text{(equation 4)}$$

Here, the PI(s) given by above-mentioned equation 4 is a computation referred to as a proportional integral computation (PI computation) shown by the equation 3 in the Embodiment 1.

Here, in the above-mentioned feedback computation unit 106, parameters that are used to calculate the feedback loop are: gain that relates to the entire transfer function FB(s) of the feedback loop, that is, the loop gain Kv; a PI zero-point frequency ωi that is a zero-point frequency ωi in the proportional integral computation; the filter frequency ωf that is a pole frequency ωf of the low-pass filter LPF(s); and a zero-point frequency shown a positional gain Kp (hereinafter referred to as the positional gain zero-point frequency Kp).

Next, the setting method of the above-mentioned computation parameter is explained based on FIG. 4. First, the response parameter ω0 is inputted from the response parameter input unit 110, and the speed gain Kv in a speed proportional amplifier 107, that is, loop gain Kv is set out based on it.

Then, a first switching signal sw1 is inputted to a first switch 114 and a third switch 144, from a first switching signal input unit 113. Here the first switching signal sw1 is a parameter that selects either the setting of an absolute value or the setting of a ratio. According to the setting, setting of an absolute value or setting of a ratio, the first switching signal sw1 switches the inputs of the first switch 114 and the third switch 144 to the left or right at the same time.

Next, when the first switching signal sw1 selects the setting of an absolute value, a first absolute value parameter ω1 is inputted from a first absolute value parameter input unit 111, and then, responding to the value, integral gain ωi of the integral amplifier 108, that is, the PI zero-point frequency ωi is set out. A third absolute value parameter ω3 is inputted from a third absolute value parameter input unit 141, and then, responding to the value, the positional gain Kp of the positional proportional amplifier 131, that is, the positional gain zero-point frequency Kp is set out.

Next, when the first switching signal sw1 selects the setting of a ratio, a first ratio parameter r1 is inputted from a first ratio parameter input unit 112. Moreover, given that a response frequency ωc is to the value in which the loop gain Kv corresponding to the response parameter ω0 is divided by an inertia moment value J, an integral gain ratio setting unit 115, based on the response parameter ω0 and the first ratio parameter r1, sets out the PI zero-point frequency ωi so that the ratio of the PI zero-point frequency ωi to the response frequency ωc becomes the value set out by the first ratio parameter r1.

Moreover, when the first switching signal sw1 selects the setting of a ratio, a third ratio parameter r3 is inputted from a third ratio parameter input unit 142 as mentioned above. Moreover, a positional gain ratio setting unit 145, based on the response parameter ω0 and the third ratio parameter r3, sets out the positional gain zero-point frequency Kp so that the ratio of positional gain zero-point frequency Kp to the response frequency ωc becomes the value set out by the third ratio parameter r3.

Next, a second switching signal sw2 is inputted to a second switch 119, from a second switching signal input unit 118. Here the second switching signal sw2 is the parameter that selects either the setting of an absolute value or the setting of a ratio. According to the setting, setting of an absolute value or setting of a ratio, the second switching signal sw2 switches the input of the second switch 119 to the left or right.

Next, when the second switching signal sw2 selects the setting of an absolute value, a second absolute value parameter ω2 is inputted from a second absolute value parameter input unit 116, and a filter frequency ωf of the low-pass filter 109 is set out corresponding the value.

Next, when the second switching signal sw2 selects the setting of a ratio, the second ratio parameter r2 is inputted from a second ratio parameter input unit 117. Moreover, a filter frequency ratio setting unit 120, based on the response parameter ω0 and a second ratio parameter r2, sets out the filter frequency ωf so that the ratio of the filter frequency ωf to the response frequency ωc set out by the response parameter ω0 becomes the value set out by the second ratio parameter r2.

Here, the characters of the first ratio parameter r1 and the second ratio parameter r2 are similar to those explained in Embodiment 1. Moreover, the character of the third ratio parameter r3 is similar to that of the first ratio parameter r1. That is, as mentioned above, the third ratio parameter r3 sets out the third ratio Kp/ωc that is the ratio of the positional gain zero-point frequency Kp to the response frequency ωc. The larger the third ratio is, the faster the motor angle θm converges to the same value as the positional command θr against outside disturbance, as a result, more accurate control can be achieved. However, when the third ratio is increased too much, the control system becomes oscillatory at frequencies in the vicinity of the response frequency ωc. Therefore, the third ratio has an indicative value in which it becomes constant regardless of the response frequency ωc, and is usually set to about 0.2–0.4 accordingly.

Next, the adjusting of the motor controller of the present invention is similar to that of the Embodiment 1. That is, as initial setting at the start of adjusting the motor controller of this invention, the setting of a ratio is selected for both the first switching signal sw1 and the second switching signal sw2. Moreover, by setting the first ratio parameter r1, the second ratio parameter r2 and the third ratio parameter r3 at an appropriate initial value, in most of cases, high-speed and accurate response can be achieved only by adjusting the response parameter ω0 so as to gradually increase after it start. That is, adjustment by one parameter similar to the prior art described in the patent document 1 can be achieved.

On the other hand, in the case of coping with variation of different control specifications corresponding to applications of the motor controller, the absolute values of the PI zero-point frequency and the filter frequency are not set out by the first absolute value input and the second absolute value input, but set out by using the first ratio input and the second ratio input, and thereby there is an advantage in that the adjustment can be performed within a fixed range based on the fixed value that has been set out as the initial value regardless of the level of response frequency ωc, resulting in the adjustment being intuitive and easy.

In addition, at early stage of the adjustment where the response frequency ωc is small, the first ratio, the second ratio and the third ratio have been changed from the initial value according to the control specification, and then the response frequency ωc is gradually increased to the vicinity of the stability limit, enabling the optimum adjustment to be achieved in a short adjusting time.

Moreover, in case where the mechanical resonance of the controlled object 3 is known to exit at such a frequency as oscillation occurs in the state of the response frequency ωc being considerably low, or oscillation occurs due to the mechanical resonance frequency in a state of the response frequency ωc being considerably low, the second switching signal is set out to the setting of an absolute value at an early stage of the adjustment, as well as the second-absolute signal is set out such that the filter frequency ωf is higher than the mechanical resonance frequency and the first switching signal remains at the setting of a ratio; and by only gradually increasing the response frequency ωc after that, adjustment that high speed and accurate control can be easily achieved even if mechanical resonance occurs.

Because the present embodiment is configured as mentioned above, the provision of the first ratio parameter input unit and the second ratio parameter input unit, enables, based on a constant value, independent of the setting of the response frequency, the adjustment to be intuitive and easy. Moreover, the first ratio, the second ratio and the third ratio have been set out according to the control specification at an early adjustment stage and then the adjustment to increase the response frequency can be performed, thereby achieving optimum adjustment in a short time coping with control specifications corresponding to various applications.

Moreover, the provision of the first switching signal input unit and the second switching signal input unit that select the setting of a ratio or the setting of an absolute value, enables, according to the control specification and the characteristics of the controlled object, optimum adjustment to be achieved in a short time.

The above explained preferred embodiments are exemplary of the present invention which is described solely by the claims below. It should be understood that modifications of the preferred embodiments may be made as would occur to one of skill in the art.

What is claimed is:

1. A motor controller for driving, by torque from a motor responding to a computed torque command, an object to be controlled, the object being provided with the motor and a mechanical load, the motor controller comprising:

a feedback computation unit into which is inputted a positional command signal or a speed command signal, and a motor rotational signal which is a detected value of the motor's rotational angle or speed, the feedback computation unit being for computing said torque command by a computation in which the transfer function for a feedback loop from said motor rotational signal to said torque command includes a pole or a zero point;

a response parameter input unit for inputting a response parameter; and a ratio parameter input unit for inputting a ratio parameter; wherein a loop gain which is the gain of said feedback loop is determined based on said response parameter, and based on said response parameter and said ratio parameter, the pole or the zero point of said feedback loop is determined in such a way that the ratio of a response frequency which is quotient of said loop gain divided by an inertia value of the controlled object, to a frequency corresponding to the pole or the zero point of said feedback loop, is the value determined by said ratio parameter.

2. A motor controller for driving, by torque from a motor responding to a computed torque command, an object to be controlled, the object being provided with the motor and a mechanical load, the motor controller comprising:

a feedback computation unit into which is inputted a command signal, and a motor rotational signal which is a detected value of the motor's rotational angle or speed, the feedback computation unit being for computing said torque command by a computation in which the transfer function for a feedback loop from said motor rotational signal to said torque command includes a pole or a zero point;

a response parameter input unit for inputting a response parameter; and an absolute value parameter input unit for inputting an absolute value parameter;

a ratio parameter input unit for inputting a ratio parameter; and a switching signal input unit for inputting a switching signal for selecting either the setting of an absolute value or the setting of a ratio; wherein a loop gain which is the gain of said feedback loop is determined based on said response parameter;

when said switching signal selects the setting of an absolute value, the zero point or the pole of said feedback loop is determined based on said absolute value parameter, independently from said response parameter; and when said switching signal selects the setting of a ratio, based on said response parameter and said ratio parameter, the pole or the zero point of said feedback loop is determined in such a way that the ratio of a response frequency which if quotient of said loop gain divided by an inertia value of the controlled object, to a frequency corresponding to the pole or the zero point of said feedback loop, is the value determined by said ratio parameter.

3. A motor controller according to claim 2, wherein:

the feedback computation unit computes said torque command by a computation in which the transfer function for a feedback loop from the motor rotational signal to the torque command includes a plurality of poles or zero points; and respective pluralities of said absolute value parameter input units, ratio parameter input units, and switching signal input units are provided each corresponding to said plurality of zero-points or poles of said feedback loop.

4. A motor controller according to claim 2, further comprising:

a controlled-object characteristic estimation unit for at least partially estimating characteristics of the object, based on the detected value of the motor's rotational angle or speed, wherein, the switching signal is automatically determined according to the result of estimation by said controlled-object characteristics estimation unit.

5. A motor controller for driving, by torque from a motor responding to a computed torque command, an object to be controlled, the object being provided with said motor and a mechanical load, the motor controller comprising:

a feedback computation unit into which is input a speed command signal and a motor-speed which is a detected value of said motor's speed, the feedback computation unit being for computing said torque command by a computation in which the transfer function for a feedback loop from said motor speed to said torque command is obtained by a proportional integral computation and a low-pass filter computation;

a response parameter input unit for inputting a response parameter;

a first absolute-value parameter input unit for inputting a first absolute-parameter;

a first ratio parameter input unit for inputting a first ratio parameter; and a first switching signal input unit for inputting a first switching signal for selecting either the setting of an absolute value or the setting of a ratio;

a second absolute-value parameter input unit for inputting a second absolute-value parameter;

a second ratio parameter input unit for inputting a second ratio parameter; and a second switching signal input unit for inputting a second switching signal for selecting either the setting of an absolute value or the setting of a ratio; wherein:

a loop gain which is the gain of said feedback loop is determined based on said response parameter;

when said first switch signal selects the setting of an absolute value, a PI zero-point frequency which is the frequency of a zero point of proportional integral computation is determined based on the first absolute value parameter, independently from said response parameter;

when said first switching signal selects the setting of a ratio, said PI zero-point frequency is determined, based on said response parameter and said first ratio parameter, in such a way that the ratio of said response frequency to said PI zero-point frequency is the value determined by said first ratio parameter;

when said second switching signal selects the setting of an absolute value, a low-pass filter frequency which is a pole frequency of said low-pass filter computation is determined based on said second absolute value parameter, independently from said response parameter; and when said second switching signal selects the setting of a ratio, said low-pass filter frequency is determined in such a way that the ratio of said response frequency to said low-pass filter frequency, is the a value determined by said second ratio parameter.

6. A motor controller according to claim 3, further comprising:

a controlled-object characteristic estimation unit for at least partially estimating characteristics of the object, based on the detected value of the motor's rotational angle or speed, wherein, the switching signal is automatically determined according to the result of estimation by said controlled-object characteristics estimation unit.

* * * * *